Patented Aug. 20, 1946

2,406,127

UNITED STATES PATENT OFFICE 2,406,127

PROCESS OF FABRICATING TAPE

Johannes Alfthan, New York, N. Y., assignor to E. I. du Pont de Nemours & Company, Wilmington, Del., a corporation of Delaware No Drawing. Application May 25, 1944, Serial No. 537,366

7 Claims. (Cl. 18—47.5)

This invention relates to a process of fabricating tape and, more particularly, to a process of fabricating polytetrafluoroethylene tape.

An object of the present invention is to provide a practical process for fabricating polytetrafluoroethylene tape of good mechanical strength and uniformity. A further object is to provide a process for fabricating polytetrafluoroethylene tape of low power factor and high di-electric strength suitable for use as insulating tape for wrapping around electrical conductors. Other objects will be apparent from the description of the invention given hereinafter.

The above objects are accomplished according to the present invention by pressing finely divided polytetrafluoroethylene powder into a preform, baking the preform at a temperature above 327° C. but below 500° C. until it is sintered throughout, cooling the preform, shaving tape from it, heating the tape to a temperature above 327° C. but below 500° C., and then quenching the tape. The tape may be drawn slightly while hot to improve its surface; further, the tape may be rolled down to 40%–80% of its original thickness whereby the power factor of the tape is appreciably lowered and the di-electric strength increased.

The following examples illustrate specific embodiments of the present invention:

Example I

A ring was pressed from micropulverized polytetrafluoroethylene at 1,000 lbs. per square inch pressure. This ring was dimensioned: outside diameter 4 inches, inside diameter 1½ inches, thickness ¾ inch. The ring was baked for two hours at 360° C. at the end of which time it was sintered throughout, and was then cooled in air. Tape 0.007 inch thick was shaved from the ring and a sample of this tape was preserved for electrical tests. The remainder of the tape was passed through molten heat transfer salt maintained at a temperature between 360° C. and 400° C., and quenched in cold water. A portion of this tape was preserved for electrical tests. The remainder of the tape was rolled to 75% of its original thickness.

The di-electric strength of the three samples made above was determined by A. S. T. M. method D–295–38T and found to have the following values:

Di-electric strength:

| | Volts per mil |
|---|---|
| As shaved | 540 |
| After quenching | 785 |
| After rolling | 1350 |

The above values represent averages of many readings and show the appreciable increase in the di-electric strength by the heating and quenching of the tape and the further step of rolling the tape.

Example II

A disc having an outside diameter of 10 inches, an inside diameter of 6 inches, and a thickness of 1½ inches was pressed from finely divided polytetrafluoroethylene powder and baked at a temperature somewhat above 350° C. until sintered throughout. A continuous length of tape 0.006 inch in thickness was shaved from this disc and passed through a molten heat transfer salt bath maintained at 340° C.–375° C. Thereafter the tape was passed through a 10 inch air gap and quenched by threading through a water tank 4 ft. long, making 6 passes in the tank. The tape was then rolled to a thickness of 0.003 inch–0.004 inch. Throughout the treatment the tape was held under sufficient tension to prevent crimping at the edges. The resulting tape was mechanically uniform and possessed excellent electrical properties.

A further length of tape was made as above except that the molten heat transfer salt bath was maintained at a temperature of 400° C.–425° C. The resultant tape likewise possessed excellent properties for use as electrical insulation.

Example III 310 grams of finely divided polytetrafluoroethylene was formed into a blank ring having an outside diameter of 3½ inches, an inside diameter of 1⅛ inches, and 1 inch thickness, under 500 lbs. per square inch pressure. This ring was then baked at 360° C. until thoroughly sintered. After cooling, several strips of tape were shaved from the ring in varying thicknesses from 0.005 inch to 0.014 inch. All of this tape was then heat treated by being given five passes in a baking oven maintained at 400° C., the speed of travel of the tape being such that each portion was exposed to a heating time of about two minutes. From the baking oven, the strips of tape were passed directly into cold water for quenching and the strips were then cold rolled in a two roll mill to 40% of their original thickness. Tape having excellent properties for use as electrical insulation was thus obtained.

Example IV

Finely divided polytetrafluoroethylene was pressed under 500 lbs. per square inch pressure into a rectangular cake measuring approximately 5 inches by 8 inches by ⅞ inch. This cake was baked for two hours at 360° C. between two ¼ inch plates which served to keep the cake flat. After the cake was slowly cooled it was fastened with screws to a wooden block and sheeted with a planer knife. The resulting sheets were then heated to 380° C. and quenched in cold water, and then rolled to 40%–80% of their original thickness. Smooth tough sheets of polytetrafluoroethylene were thus obtained.

*Example V*

Micropulverized polytetrafluoroethylene was pressed under 300 lbs. per square inch pressure in a cylindrical compression die 10 inches in diameter to form a cylinder having an outside diameter of 10 inches, an inside diameter of 6 inches, and a height of 1 inch. This preform was baked for two hours at 300° C. and two hours at 360° C. which resulted in its being sintered thoroughly. The preform was then cooled at a rate not exceeding 30° C. per hour and a continuous length of tape 0.007 inch in thickness was sheeted therefrom and passed rapidly through molten heat transfer salt held at 400° C. As a result of this heating treatment, the tape was raised to above 327° C. throughout and it was led directly into cold water upon leaving the heat transfer salt bath. The resulting tape possessed excellent electrical properties.

A portion of the tape thus obtained was rolled with standard jewelers rolls to 60% of its original thickness with a noticeable improvement in the electrical properties of the tape resulting.

It will be understood that the above examples are merely illustrative and that the invention broadly comprises baking the preform of polytetrafluoroethylene at a temperature above 327° C., shaving tape from the preform, heating the tape to a temperature above 327° C., and then quenching the tape. While the invention has been described particularly with respect to the production of tape, the process is equally capable of producing sheets as shown in Example IV, and the term "tape" is used herein to denote tape of all widths which, of course, includes sheets as well.

The success of the present process depends to some extent upon the use of very finely divided polytetrafluoroethylene in making the preform. Although inferior products can be made employing coarser polytetrafluoroethylene in the making of the preform, it is preferred to use a powder which will pass a No. 10 U. S. standard screen. This fine state of subdivision of polytetrafluoroethylene may be realized by preparation of the polymer in a violently agitated system, or by subjecting the polymer to a mechanical subdivision step prior to the pressing, such as micropulverization. It is also practical to subject a slurry of the polymer in alcohol or the like to a treatment which will reduce its particle size.

It has been found necessary to bake the preform at a temperature above 327° C. until the polymer of the preform is sintered throughout. A temperature above 350° C. is ordinarily used. The duration of the baking treatment will vary considerably, largely depending upon the size and shape of the preform being baked. Likewise, the heating step prior to quenching must be conducted at a temperature in excess of 327° C. In neither of these heating treatments should the polymer be subjected to temperatures in excess of 500° C. In forming the preform, the pressure employed may vary from 50 lbs. to 10,000 lbs. per square inch, the specific pressure most suitable in any particular instance depending chiefly upon the size and shape of the preform desired. Normally, it is preferred that a pressure between 100 lbs. and 3,000 lbs. per square inch be employed. It has been found advantageous in some cases to wet the polytetrafluoroethylene powder with a liquid such as ethanol or the like prior to the pressing step but this is not necessary and, where some liquid has been used to wet the polymer, it must be removed from the preform prior to the baking step.

The process has been described with respect to finely divided polytetrafluoroethylene but is equally applicable to interpolymers of polytetrafluoroethylene, e. g., with ethylene, isobutylene, or the like. Moreover, there may be incorporated with the polytetrafluoroethylene powder modifiers such as powdered mica, metal titanates, e. g., barium titanate, or the like. These modifiers should be mixed with the powdered polytetrafluoroethylene prior to pressing the preforms.

The specific examples have shown quenching of the heated tape in water but other liquid mediums are suitable so long as they are inert to the polytetrafluoroethylene. Ethanol, acetone, liquid air, and many other liquids have been successfully used. The widest variation in the temperature of the quenching medium is permitted providing that the temperature does not exceed 250° C. It is preferred to employ water maintained at approximately room temperature or slightly below. The quenching may also be effected by passing the heated tape upon emergence from the heating chamber through rolls. In fabrication of very thin tape, it is possible to quench in circulating gases. In several of the examples the medium employed for heating the tape was a molten heat transfer salt. In each instance the salt was a eutectic mixture of sodium nitrate and sodium nitrite.

If it is desired to fabricate a blank having a minimum dimension in excess of 1 inch, certain precautions should be taken in order to obtain a flawless blank from which the tape may be shaved. In making blanks of these larger dimensions the preforms should be heated to a temperature of 300° C.-327° C. until the temperature in at least some portions of the preform is above 300° C., further heating the preform at a temperature above 327° C. until it is sintered, the rate of increase in temperature above 327° C. not exceeding 35° C. per hour, cooling the resulting sintered blank at a rate not exceeding 30° C. per hour to below about 300° C., and thereafter continuing said cooling at a rate not exceeding 80° C. per hour to below about 250° C. This procedure is fully disclosed in copending application Serial No. 528,650, entitled "Polytetrafluoroethylene articles," filed March 29, 1944, in the names of the present applicant and John L. Chynoweth, now Patent No. 2,396,629.

The particular mechanical means employed for shaving the tape from the polytetrafluoroethylene blank forms no part of the present invention. As shown in Example IV, the blank may be formed in the shape of a rectangular mass and sheets cut therefrom by a planer knife. More usually, the blank would be formed cylindrical in shape and be mounted axially upon a mandrel which is then placed in a lathe and the tape then shaved from it. Other mechanical means for accomplishing these results will be apparent.

The present invention provides a very practical method for fabricating polytetrafluoroethylene tape highly adapted for use in electrical insulation. The tape obtained by this process is of good mechanical strength and high uniformity beside being possessed of unusually high di-electric strength and low power factor.

As many apparently widely different embodiments of this invention may be made without departing from the spirit and scope thereof, it is to be understood that the invention is not limited to the specific embodiments thereof except as defined in the appended claims.

I claim:

1. Process of fabricating polytetrafluoroethylene tape which comprises pressing finely divided polytetrafluoroethylene powder into a preform, baking said preform at a temperature above 327° C. and below 500° C. until said preform is sintered throughout, cooling the resulting sintered preform, shaving tape from said preform, heating said tape to a temperature above 327° C. and below 500° C., and quenching said tape.

2. Process of fabricating polytetrafluoroethylene tape which comprises pressing finely divided polytetrafluoroethylene powder into a preform, baking said preform at a temperature above 327° C. and below 500° C. until said preform is sintered throughout, cooling the resulting sintered preform, shaving tape from said preform, heating said tape to a temperature above 327° C. and below 500° C., quenching said tape, and rolling said tape to from 40% to 80% of the original thickness thereof.

3. Process of fabricating polytetrafluoroethylene tape which comprises pressing finely divided polytetrafluoroethylene powder into a preform, baking said preform at a temperature above 350° C. and below 500° C. until said preform is sintered throughout, cooling the resulting sintered preform, shaving tape from said preform, heating said tape to a temperature above 327° C. and below 500° C., and quenching said tape in a liquid medium at a temperature below 250° C.

4. Process of fabricating polytetrafluoroethylene tape which comprises pressing finely divided polytetrafluoroethylene powder into a perform, baking said preform at a temperature above 350° C. and below 500° C., until said preform is sintered throughout, cooling the resulting sintered preform, shaving tape from said preform, heating said tape to a temperature above 327° C. and below 500° C., and quenching said tape in water at approximately room temperature.

5. Process of fabricating polytetrafluoroethylene tape which comprises pressing finely divided polytetrafluoroethylene powder into a preform, baking said preform at a temperature above 350° C. and below 500° C. until said preform is sintered throughout, cooling the resulting sintered preform, shaving tape from said preform, heating said tape to a temperature above 327° C. and below 500° C., quenching said tape in water at approximately room temperature, and rolling said tape to from 40% to 80% of the original thickness thereof.

6. Process of fabricating polytetrafluoroethylene tape which comprises pressing finely divided polytetrafluoroethylene powder at a pressure of 100 lbs.–3,000 lbs. per square inch into a preform, baking said preform at a temperature above 350° C. and below 500° C. until said preform is sintered throughout, cooling the resulting sintered preform, shaving tape from said preform, heating said tape to a temperature above 327° C. and below 500° C., and quenching said tape in water at approximately room temperature.

7. Process of fabricating polytetrafluoroethylene tape which comprises pressing finely divided polytetrafluoroethylene powder at a pressure of 100 lbs.–3,000 lbs. per square inch into a preform, baking said preform at a temperature above 350° C. and below 500° C. until said preform is sintered throughout, cooling the resulting sintered preform, shaving tape from said preform, heating said tape to a temperature above 327° C. and below 500° C., quenching said tape in water at approximately room temperature, and rolling said tape to from 40% to 80% of the original thickness thereof.

JOHANNES ALFTHAN.